(12) United States Patent
Lin

(10) Patent No.: US 9,674,657 B1
(45) Date of Patent: Jun. 6, 2017

(54) TECHNIQUES FOR REMOTE TRACKING

(71) Applicant: Symantec Corporation, Mountain View, CA (US)

(72) Inventor: Yi-Zen Lin, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 77 days.

(21) Appl. No.: 14/268,352

(22) Filed: May 2, 2014

(51) Int. Cl.
*H04W 12/10* (2009.01)
*H04W 4/02* (2009.01)

(52) U.S. Cl.
CPC .................. *H04W 4/021* (2013.01)

(58) Field of Classification Search
CPC ...... H04W 12/10; H04L 63/123; G01S 19/42; G08G 1/017
See application file for complete search history.

(56) References Cited

U.S. PATENT DOCUMENTS

| | | | | |
|---|---|---|---|---|
| 5,552,794 | A | * 9/1996 | Colley | G01S 19/42 342/352 |
| 2009/0024309 | A1 | * 1/2009 | Crucs | G08G 1/015 701/118 |
| 2015/0024711 | A1 | * 1/2015 | Stob | H04W 4/02 455/411 |

* cited by examiner

*Primary Examiner* — Myron K Wyche
(74) *Attorney, Agent, or Firm* — Wilmer Cutler Pickering Hale and Dorr LLP

(57) ABSTRACT

Techniques for remote tracking may be realized as a method including: receiving tracking parameters comprising one or more restrictions, wherein each restriction of the one or more restrictions includes a property other than a position; monitoring a position of a client device; receiving location information for the monitored position of the client device, the location information including one or more properties other than position; and determining that the monitored position of the client device transgresses a restriction of the one or more restrictions, wherein the determination includes determining that location information of the monitored position satisfies a property of the restriction other than position.

20 Claims, 4 Drawing Sheets

TECHNIQUES FOR REMOTE TRACKING

FIELD OF THE DISCLOSURE

The present disclosure relates generally to location tracking, and, more specifically, to techniques for remote tracking.

BACKGROUND OF THE DISCLOSURE

Remote tracking allows an administrator to set parameters for the location of subjects, automatically responding in a predetermined fashion whenever certain parameters are met. For example, geofencing allows an administrator to define an area that a user is not allowed to leave. A parent may say that their child should only be at home, school, or somewhere in between. An employer may say that their truck drivers should only be on their delivery routes. If the geofencing policy is violated, then the administrator is alerted. As an additional example, an administrator may be alerted if a user's behavior puts it within a forbidden area (such as an employee going to an unauthorized part of a facility or a child entering an adults-only area).

However, these techniques require the administrator to define specific locations that trigger alerts—for instance, if a parent does not know that a specific location corresponds to an adults-only area such as a bar, the parent will not create a tracking parameter that generates an alert based on this area.

In view of the foregoing, it may be understood that there may be significant problems and shortcomings associated with current remote tracking technologies.

SUMMARY OF THE DISCLOSURE

Techniques for remote tracking are disclosed. In one embodiment, the techniques may be realized as a method comprising the steps of receiving tracking parameters comprising one or more restrictions, wherein each restriction of the one or more restrictions includes a property other than a position; monitoring a position of a client device; receiving location information for the monitored position of the client device, the location information including one or more properties other than position; and determining that the monitored position of the client device transgresses a restriction of the one or more restrictions, wherein the determination includes determining that location information of the monitored position satisfies a property of the restriction other than position.

In accordance with other aspects of this embodiment, the method may further comprise generating a notification in response to determining that the monitored position transgresses the restriction.

In accordance with further aspects of this embodiment, the notification may include the received location information for the monitored position of the client device.

In accordance with other aspects of this embodiment, the property may be a type of business or may be a type of event. Determining that the monitored position of the client device transgresses the restriction may further include determining that a current time matches a time for an event of the type specified by the restriction.

In accordance with other aspects of this embodiment, the method may further comprise determining that the client device is lingering at the monitored position, wherein the determination includes determining that the client device has been within a predetermined threshold distance of the monitored position for a duration exceeding a predetermined threshold duration. The predetermined threshold distance and the predetermined threshold duration may each be associated with the tracking parameters.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

The present disclosure relates to improving usability and security of existing remote tracking solutions by providing for automatic identification of locations. When setting remote tracking parameters, an administrator can identify characteristics of a location that should result in an alert, such as a business category, event type, etc. A system can retrieve data about any location that the monitored user (e.g. the child) is identified as attending, and alert the administrator based on the identified characteristics. This allows, for example, a parent to receive an alert any time the child stops at a location offering adults-only service such as a bar or casino. It may also alert the parent if the child's location at a particular time corresponds to the time and location of a community event such as a concert or rally.

Figure 1:
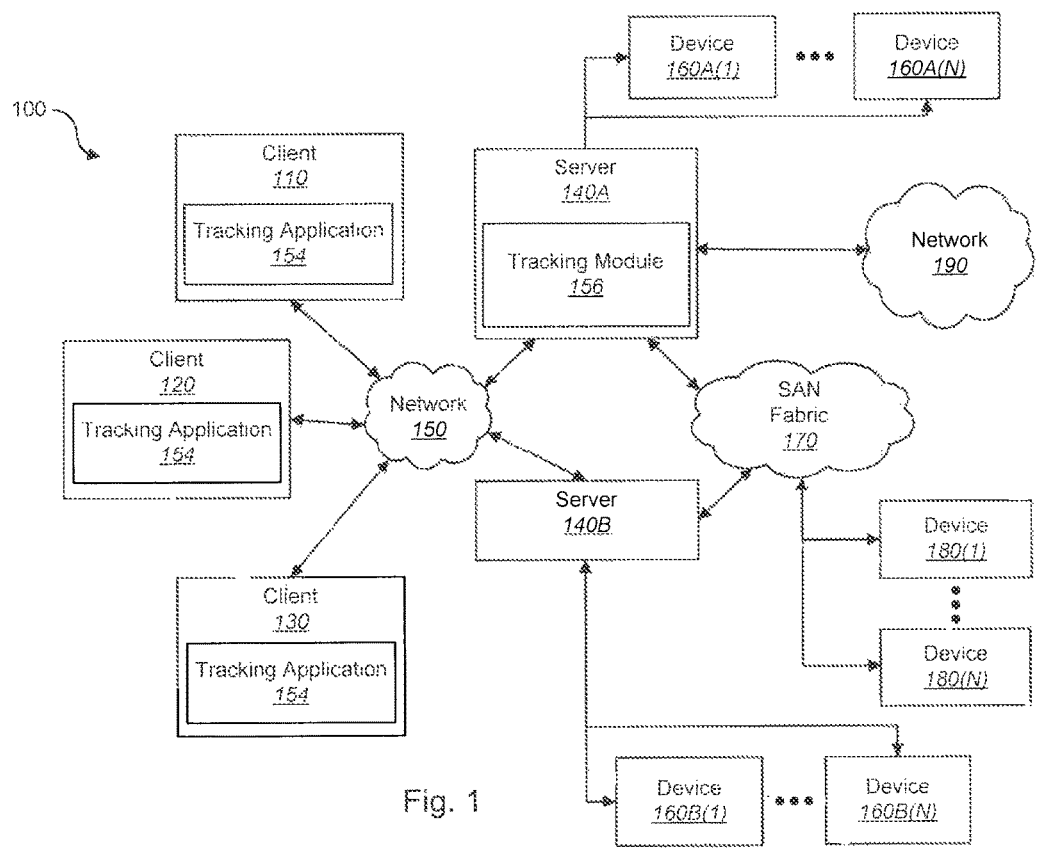
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
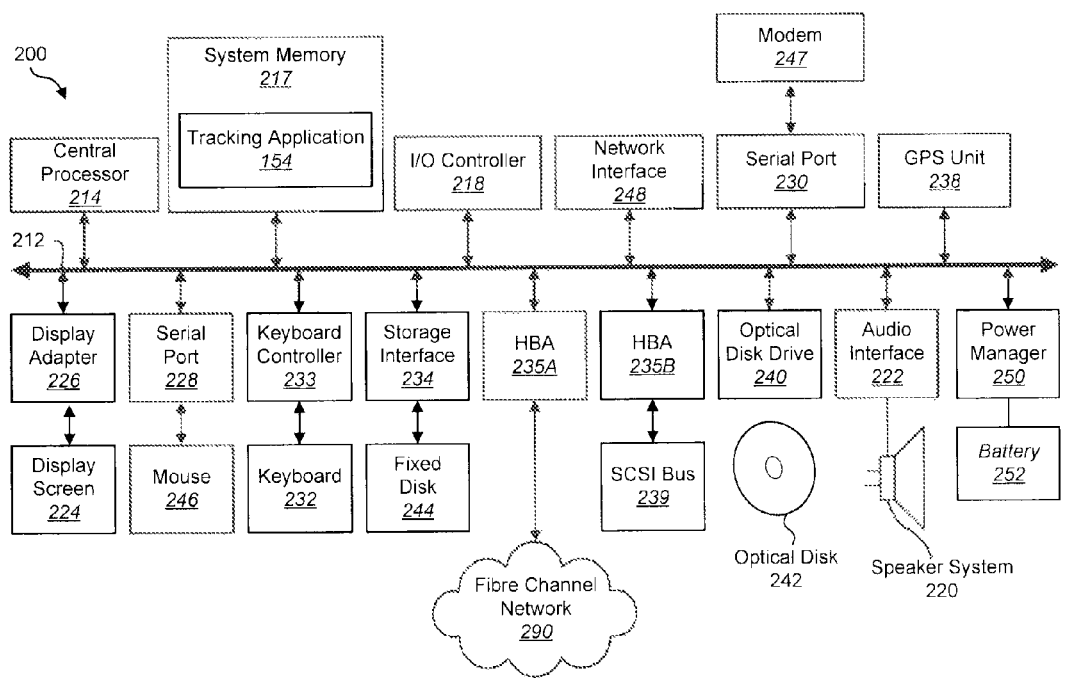
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of remote tracking processes such as, for example, tracking application 154, while server 140A may include one or more portions such as, for example, tracking module 156. Further, one or more portions of the tracking module 156 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including tracking module 156 may be implemented as part of a cloud computing environment.

FIG. 2 shows a block diagram of a computer system 200 in accordance with an embodiment of the present disclosure. Computer system 200 is suitable for implementing techniques in accordance with an embodiment of the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit (not shown), a removable disk unit (e.g., Universal Serial Bus drive), or other storage medium. According to some embodiments, tracking application 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like. GPS unit 238 may receive position information, such as the standardized signals sent by the global positioning system, and may be configured to provide position information based on the received signals.

Many other devices or subsystems (not shown) may be connected in a similar manner (e.g., document scanners, digital cameras and so on). Conversely, all of the devices shown in FIG. 2 need not be present to implement an embodiment of the present disclosure. The devices and subsystems can be interconnected in different ways from that shown in FIG. 2. Code to implement an embodiment of the present disclosure may be stored in computer-readable storage media such as one or more of system memory 217, fixed disk 244, optical disk 242, or floppy disk (not shown). Code to implement an embodiment of the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
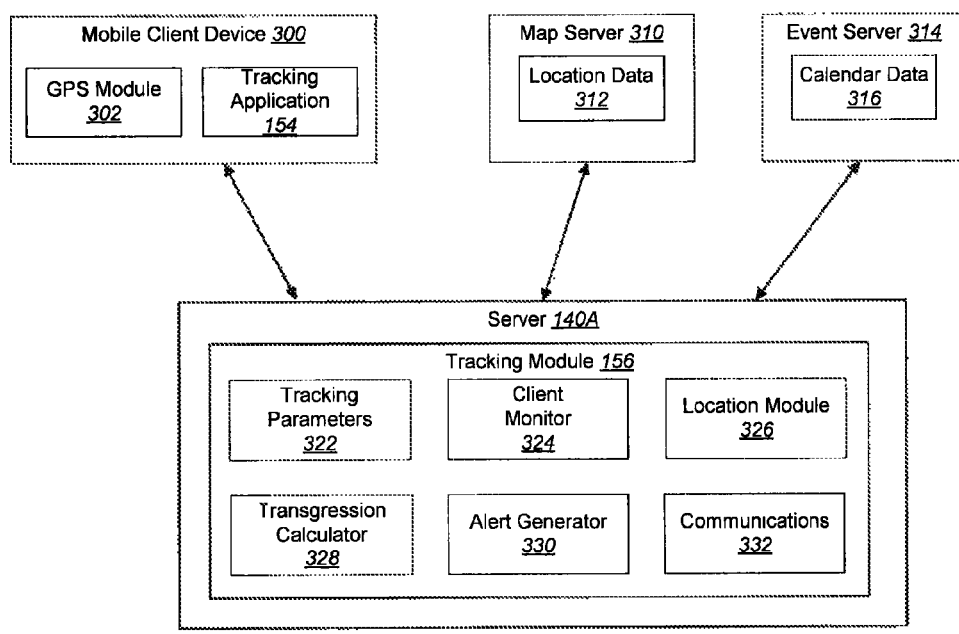
FIG. 3 shows a block diagram of a mobile client device, monitoring server, map server, and event server in accordance with an embodiment of the present disclosure.

In one embodiment, a client system 110 may be a mobile device 300 as illustrated in FIG. 3. The mobile client device 300 may include a GPS module 302 that monitors received global positioning signals and uses those signals to determine a position for the client device 300. In some implementations, the GPS module 302 may further control a GPS receiver unit and other units associated with receiving and signaling position. Once the GPS receiver unit determines position information, the information may then be relayed to other applications for further use in navigation and tracking, such as a tracking application 154.

The tracking application 154 may communicate with the tracking module 156 of a server 104A. The application 154 may report position information to the module 156 at regular intervals, or in response to certain events determined at the client device 300, or in response to a request for position information from the module 156. In some implementations, the tracking application 154 may not be a standalone application, but instead may be a feature of another application, of an operating system, of a module such as the GPS module, or the like.

The tracking module 156 may include tracking parameters 322, which specify where the mobile client device 300 is permitted to be. The tracking parameters may include, for example, one or more geofencing parameters. The geofencing parameters may in turn include one or more positions or objects and an allowed distance from each; the allowed distances may be the same or may be different. The geofencing parameters may include, for example, one or more borders and a side of each border that the client device is permitted to be on. These parameters may further include one or more navigation routes, which may represent an allowed region between two targets such that the client device is permitted to be within a set distance of either target or along the route between them. Other settings, options, and configurations for geofencing are known in the art.

In addition to the geofencing parameters, the tracking parameters 322 further include one or more restrictions based on properties of a location or event. These restrictions may include categories of locations that the user associated with the client device 300 should not be visiting, such as businesses offering adult services when the tracked user is a child, or recreational businesses when the tracked user is an on-the-job employee. The tracking parameters 322 may also include distances and durations for each of the restrictions. The distance and duration may be the same for each restriction or may vary. The duration represents a minimum time in which the user would need to be proximate a particular location to be in transgression of the restriction, while the distance sets a threshold for how close the device 300 would need to be to a location of the appropriate type. The distance and duration for a given restriction may be set by default, may be adjusted automatically, or may be set by the administrator of the tracking module 156.

The tracking module 156 may include a client monitor 324, which monitors the position and status of the client device 300 in accordance with the tracking parameters 322. The client monitor 324 may communicate with a tracking application 154 on the client device 300, may otherwise communicate with the client device 300, or may retrieve information about the client device 300 indirectly, such as from another system in network communication with the client device 300. In some implementations, the client monitor 324 may receive information from a service network providing telephone or data service to the client device 300. The device information monitored may include position information but also device status, such as the level of battery charge, whether the device is in a special operating mode such as "hands-free" or "airplane," and whether the device is connected to a wireless network.

The tracking module 156 may include a location module 326, which identifies properties of locations that are relevant to tracking parameters 322. The location module 326 may only identify the properties of locations that may potentially violate the parameters 322; for example, whether the client's location is subject to a particular restriction may only be checked once the client has stayed in the same location for that restriction's associated duration.

The location module 326 may consult external sources for identifying the properties of the client's location, such as a map server 310 or event server 314. A map server 310 may include location data 312 that it provides on request based on parameters requested by a user. The map server 310 may be accessed by means of a website interface, by an application, or by means of an API. An event server 314 may provide locations and properties of events from calendar data 316 according to queries it receives, and may also be accessed by a website interface, application, or API. The location module 326 may use keywords identified by the administrator when creating tracking parameters 322 or keywords which the system associates with a particular location property. In some implementations, a learning algorithm may be employed in order to refine the process by which the location module identifies data relevant to the tracking parameters 322.

The tracking module 156 may further include a transgression calculator 328 which compares the position of the client device 300 with the tracking parameters 322 to determine if the client device 300 has transgressed the geofences or restrictions. In some implementations, the transgression calculator 328 may apply the duration and distance associated with each restriction to determine if the client device 300 has lingered, and apply the location information retrieved by the location module 326 to confirm that a restriction has been transgressed.

The tracking module 156 may further include an alert generator 330, which may generate a notification event, an alarm, or other alert in response to a transgression of the client device 300 as determined by the transgression calculator 328. In some implementations, a communications module 332 may be used to provide an alert, which in some implementations may include a message such as an email or SMS message. A push or other application notification may also be sent as an alert. For transgression of a location property restriction, the alert may include information about the restriction that was violated, as well as any information regarding the location that was used to determine a transgression of the restriction (such as the name and property of the restricted business or information associated with the restricted event). In addition to sending this alert to the administrator, an alert or other warning may optionally be sent to the client device 300 as well, alerting the user of the restricted location.

Figure 4:
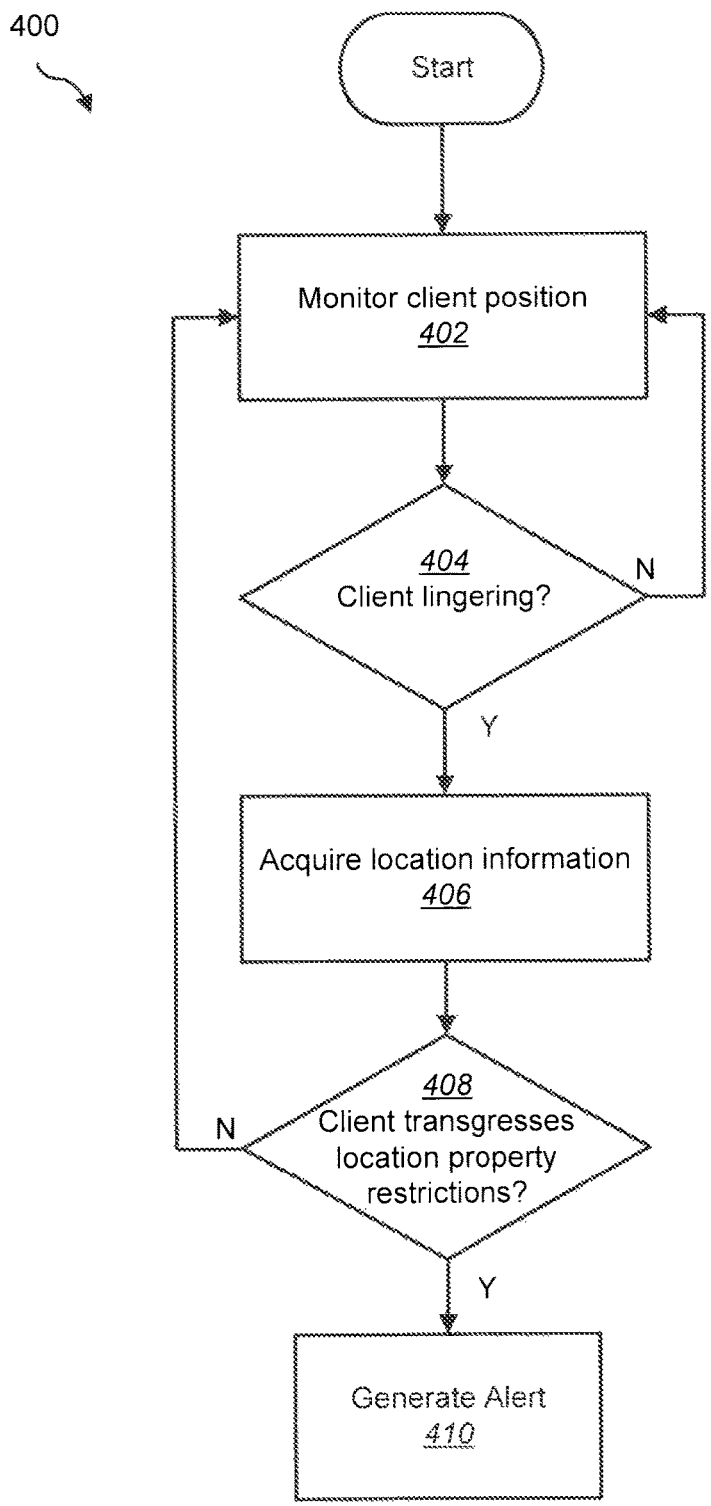
FIG. 4 shows a method for remote tracking in accordance with an embodiment of the present disclosure.

FIG. 4 illustrates a method 400 for remote tracking. The system monitors the position of a mobile client (402). The system may receive data from the mobile client reflecting a position, such as GPS data from an on-board GPS unit; the system may also receive data from other systems, such as communications systems providing network connectivity to the mobile client. In some implementations, the system may request data from the mobile client; alternatively, the mobile client may send position data to the system at a particular interval or in response to a particular event.

The system determines whether the position of the client is stationary enough to be considered to be lingering in a particular location (404). This determination may represent tracking parameters known in the art; that is, one of ordinary skill may recognize how to determine that a client is stationary for a sufficient duration. It will be noted that the position of the mobile client is not always precisely determinable; in some implementations, an imprecise range may be determined for the client position and the system may have to determine whether to consider the client to be lingering based on ambiguity in the client location. The system may, in some implementations, determine a probability distribution for the position of the mobile device based on the reported error and a record of the client's previous positions, and consider the client to have lingered at a location only if a probability exceeds a threshold value. Other techniques to deal with ambiguous location in remote tracking are known in the art. If the mobile client is considered to be moving past locations rather than identified with a specific location, the system continues to monitor the client position.

According to the method 400 of FIG. 4, which is only one possible method to implement a process in accordance with an embodiment of the present disclosure, if the client is found to have lingered at a particular location, information on that location is acquired (406). The data may be acquired from a particular external site or multiple sources; the system may also include an internal database which includes data from locations which have previously been matched for a particular user or other users.

The location data is compared to the specified restrictions to determine if the tracking parameters have been transgressed (408). If the location information does not match any of the restricted properties, such as if no business or event matches any of the parameters identified as a restricted location, then the mobile system returns to monitoring the client position.

If the client device is found to transgress the location restrictions, then the system may generate an alert (410). The alert may be any message or communication designed to identify that a transgression event has occurred. In some implementations, the alert may be given to a third party such a monitoring service or to the authorities. The alert may include a notification to the client device, such as an application notification or SMS message. Alternatively, the client device itself may not be included in the alert.

In some implementations, the generation of an alert may temporarily stop the tracking process, although some monitoring of the mobile client device may continue. In some implementations, further monitoring (including additional alerts) may be possible after a set interval.

At this point it should be noted that remote tracking in accordance with the present disclosure as described above may involve the processing of input data and the generation of output data to some extent. This input data processing and output data generation may be implemented in hardware or software. For example, specific electronic components may be employed in a mobile device or similar or related circuitry for implementing the functions associated with remote tracking in accordance with the present disclosure as described above. Alternatively, one or more processors operating in accordance with instructions may implement the functions associated with remote tracking in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been presented herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
   receiving tracking parameters comprising one or more restrictions, wherein each restriction of the one or more restrictions includes a property other than a position;
   monitoring a position of a client device, wherein the monitored position of the client device is based on an imprecise range, wherein the imprecise range is based on a probability distribution of a location of the client device based on a reported error and a previous position of the client device;
   receiving location information for the monitored position of the client device, the location information including one or more properties other than position, wherein the one or more properties are associated with location; and
   determining that the monitored position of the client device transgresses a restriction of the one or more restrictions, wherein the determination includes determining that the location information of the monitored position satisfies a property of the restriction other than position.

2. The method of claim 1, further comprising:
   generating a notification in response to determining that the monitored position transgresses the restriction.

3. The method of claim 2, wherein the notification includes the received location information for the monitored position of the client device.

4. The method of claim 1, wherein the property is a type of business.

5. The method of claim 1, wherein the property is a type of event, and wherein determining that the monitored position of the client device transgresses the restriction further includes determining that a current time matches a time for an event of the type specified by the restriction.

6. The method of claim 1, further comprising:
   determining that the client device is lingering at the monitored position, wherein the determination includes determining that the client device has been within a predetermined threshold distance of the monitored position for a duration exceeding a predetermined threshold duration.

7. The method of claim 6, wherein the predetermined threshold distance and the predetermined threshold duration are each associated with the tracking parameters.

8. At least one non-transitory processor readable storage medium storing a computer program of instructions configured to be readable by at least one processor for instructing the at least one processor to execute a computer process for performing the method as recited in claim 1.

9. An article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
   receive tracking parameters comprising one or more restrictions, wherein each restriction of the one or more restrictions includes a property other than a position;
   monitoring a position of a client device, wherein the monitored position of the client device is based on an imprecise range, wherein the imprecise range is based on a probability distribution of a location of the client device based on a reported error and a previous position of the client device;
   receive location information for the monitored position of the client device, the location information including one or more properties other than position, wherein the one or more properties are associated with location; and
   determine that the monitored position of the client device transgresses a restriction of the one or more restrictions, wherein the determination includes determining that the location information of the monitored position satisfies a property of the restriction other than position.

10. The article of claim 9, wherein the at least one processor is further operable to generate a notification in response to determining that the monitored position transgresses the restriction.

11. The article of claim 10, wherein the notification includes the received location information for the monitored position of the client device.

12. The article of claim 9, wherein the property is a type of business.

13. The article of claim 9, wherein the property is a type of event, and wherein determining that the monitored position of the client device transgresses the restriction further includes determining that a current time matches a time for an event of the type specified by the restriction.

14. The article of claim 9, the at least one processor further operable to determine that the client device is lingering at the monitored position, wherein the determination includes determining that the client device has been within a predetermined threshold distance of the monitored position for a duration exceeding a predetermined threshold duration.

15. The article of claim 14, wherein the predetermined threshold distance and the predetermined threshold duration are each associated with the tracking parameters.

16. A system comprising:
   one or more processors communicatively coupled to a network; wherein the one or more processors are configured to:
   receive tracking parameters comprising one or more restrictions, wherein each restriction of the one or more restrictions includes a property other than a position;
   monitoring a position of a client device, wherein the monitored position of the client device is based on an imprecise range, wherein the imprecise range is based on a probability distribution of a location of the client device based on a reported error and a previous position of the client device;
   receive location information for the monitored position of the client device, the location information including one or more properties other than position, wherein the one or more properties are associated with location; and determine that the monitored position of the client device transgresses a restriction of the one or more restrictions, wherein the determination includes determining that the location information of the monitored position satisfies a property of the restriction other than position.

17. The system of claim 16, wherein the one or more processors are further configured to generate a notification in response to determining that the monitored position transgresses the restriction.

18. The system of claim 17, wherein the notification includes the received location information for the monitored position of the client device.

19. The system of claim 16, wherein the property is a type of business.

20. The system of claim 16, wherein the property is a type of event, and wherein determining that the monitored position of the client device transgresses the restriction further includes determining that a current time matches a time for an event of the type specified by the restriction.

* * * * *